Patented Jan. 25, 1938

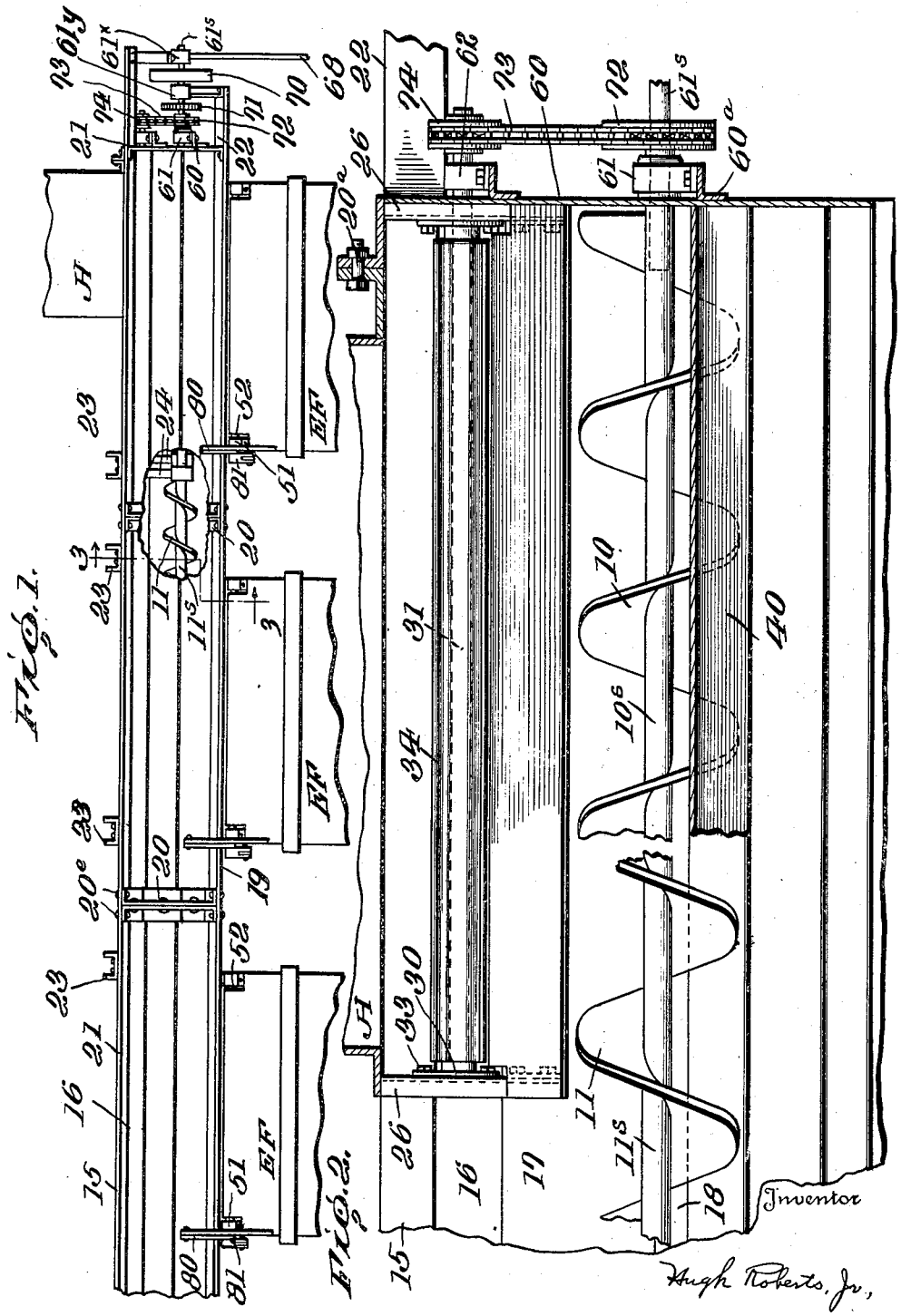

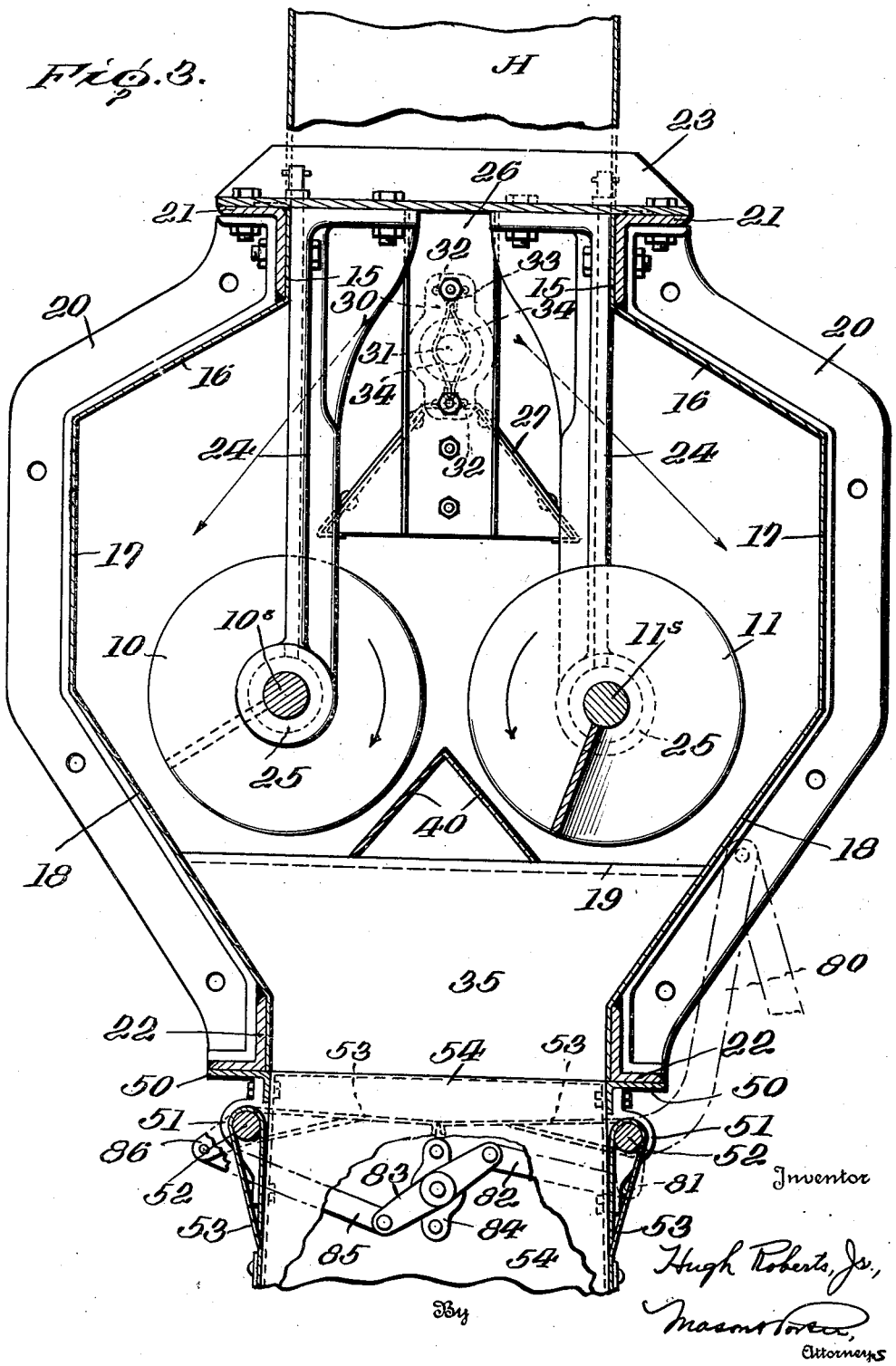

2,106,380

UNITED STATES PATENT OFFICE 2,106,380

CONVEYER-DISTRIBUTOR FOR COTTON AND LIKE MATERIALS

Hugh Roberts, Jr., Columbus, Ga., assignor to Cen-Tennial Cotton Gin Company, Columbus, Ga., a corporation of Georgia Application May 16, 1936, Serial No. 80,216

8 Claims. (Cl. 19—74)

The present invention relates to a conveyer-distributor which is particularly adapted for employment in a cotton ginning plant, for the purpose of conveying cotton from a supply point to a plurality of independent apparatus for extracting and ginning the cotton.

It has been proposed in the United States Letters Patent No. 1,864,388 to William D. Wilson, to provide a pair of screw conveyers which are mounted with their axes substantially at the same level and extending for the length of a trough which passes over the individual extractor-feeders and gins, and has openings through which the cotton may be discharged into the individual extractor-feeders and gins.

The present invention proposes certain improvements in conveyer-distributors, which are particularly suited for employment with the Wilson type of apparatus, but are not limited in employment solely thereto.

One of the features of the present invention is the provision of a conveyer-distributor having a trough, a pair of screw conveyers mounted in said trough with their adjacent sides turning downwardly, and with the bottom of the trough formed as a ridge for preventing the packing of cotton against the bottom of the trough.

Another feature of the present invention is the provision of a trough with a pair of screw conveyers having their adjacent sides turning downwardly, the trough having openings from point to point for the discharge of material into individually-fed structures, with the employment of a ridge member extending across at least one such opening.

A further feature of the present invention is the provision of a trough with a pair of screw conveyers mounted therein, and a deflector wall positioned above the screw conveyers, together with a rotating spreader for assuring the substantially uniform delivery of the material to the two screw conveyers.

A further feature of the invention is the provision of a trough extending over a plurality of devices to be supplied therefrom, the trough having independent openings in its bottom, each opening establishing communication with a corresponding device through a passage structure; the passage structure having valve means formed on its walls for shutting off the delivery of material from the conveyer into the said device.

With these and other features in view as objects of the invention, as will be set forth in the following specification and claims, an illustrative form of practicing the invention is shown on the accompanying drawings, in which:

Fig. 1 is a side elevation showing conventionally the utilization of a conveyer of the presently illustrated type in association with three extractor-feeders in a cotton ginning plant.

Fig. 2 is a longitudinal vertical sectional view, on a larger scale, of the receiving-hopper end of the conveyer-distributor.

Fig. 3 is a transverse sectional view, substantially on line 3—3 of Fig. 1, on a still larger scale.

In these drawings, Fig. 1 shows conventionally the lay-out of a portion of a cotton ginning plant. It is the practice in such a plant to provide suction means for receiving the cotton from the farmers' wagons, for example, and delivering it into a hopper H, from which it drops into a conveyer-distributor and is thus brought to and selectively discharged into the individual extractor-feeders EF according to the demands of these feeders.

According to the present invention, a pair of screws 10, 11 are mounted in the trough of the conveyer-distributor.

This trough is comprised, as shown in Fig. 3, of sheets of metal which are formed in this illustrative representation to have upper vertical portions 15, with successively therebelow an outwardly inclined portion 16, a further vertical portion 17, and a downwardly inclined portion 18. Between the individual extractor-feeders EF, the trough has a closed bottom provided by the wall 19. The shape and conformation of these sheet metal sides are maintained by the stiffening angle members 20 to which the side sheets are riveted or otherwise secured. The structure is further stiffened by the longitudinally extending top angle members 21 and bottom angle members 22 which also provide connection pieces for the upper and lower structures. At the top of the trough, the angle members 21 are connected by cross members 23 which are bolted in position and serve to maintain the spacing of these angle members 21 throughout the length of the trough. Beneath the hopper H and at the ends of the trough sections, these members also support the hanger brackets 24 which extend downward and are provided with bearing portions 25 for supporting the shafts 10s and 11s of the screw conveyers 10 and 11. It will be noted that the preferred location of these axes is in the horizontal plane of the junction angles between the sections 17 and 18 of the side walls.

These upper members 23, adjacent the hopper H, also support the downwardly extending brackets 26 which support a deflector wall 27. The deflector wall has portions which incline downwardly from its center, with the lower edges of the inclined portions located closely adjacent the tops of the corresponding screw conveyers. In the illustrated form, this deflector wall 27 has a substantially flat middle portion at its top, and covers the space between the screws.

The brackets 26 also receive bearing members 30 which support the fly shaft 31 of a deflector spreader structure. The bearing members 30 have slots 32 for receiving the securing screws 33, and permitting adjustment of the shaft from side to side to determine the uniformity of delivery to the two sides of the conveyer structure. A pair of sheet metal plates 34 are seamed together at their edges and embrace the shaft 31 for operation as the spreader structure which rotates with the shaft 31.

At the points corresponding to the extractor-feeders EF, the bottom wall 19 of the trough is of course provided with openings, and the side wall portions 18 are continued downwardly to the supporting angles 22. The opening or mouth thus provided is sealed at the end by end walls 35.

Extending the entire length of the conveyer trough is a ridge structure comprised of a pair of inclined walls 40 having its upper edge or ridge carried well up toward the horizontal plane of the axes of shafts 10s and 11s. By reason of the provision of the ridge structure a pair of discharge openings is provided overlying and leading toward each extractor-feeder unit EF.

Beneath each pair of the discharge openings of this trough structure is provided a passageway for delivering the cotton to the corresponding extractor-feeders EF and since the units EF are spaced longitudinally beneath the trough structure, as shown in Figure 1, the pairs of openings likewise are longitudinally spaced. Each of these structures comprises the angle members 50 fastened at their ends to outwardly turned flanges 54a of end walls 54, which also are connected to the pivot blocks 51 which support the shafts 52 connected to the gates 53. These gates normally form side walls of the passageway, but may be moved, by rocking the shaft 52, into the dotted line position shown for closing the passageway against the cotton therethrough, thus serving for valves for shutting off further extracting and ginning action when so desired. The end walls 35 for the trough openings are continued downwardly by the end walls 54 of such passageways.

Such a trough may be made of a plurality of parts, which are connected together by bolts 20a passing through corresponding apertures of the end angle members 20e.

The head end of the trough, or end adjacent the hopper H is closed by an end wall 60 which is secured to the corresponding stiffening angles 20 and to the corresponding bracket 26, and is provided with apertures and has a reinforcing angle 60a connected to bearing structures 61 for the shafts 10s, 11s. The shafts are usually hollow and formed of pipe, to which the screw blades are fastened, and the sections are joined adjacent the ends of the trough by short pieces of shafting which are secured in the adjacent ends of such hollow shafts and are themselves supported by hangers 24; and such shafting 61s is preferably employed (Fig. 2) in the bearings 61 and for providing the extensions to receive the driving system. A bearing 62 is provided on the end wall 60 for the shaft 31. The preferred method of driving is to provide a pulley 70 on a screw conveyer shaft portion 61s, and then to provide intermeshing gears 71 on the two shafts. The upper angle members 21 are extended and connected to a bearing 61x for the outer end of shaft 61s, and a post 68 is connected to the bearing 61x for supporting the same. Similarly, the lower angle members 22 are extended and connected to a bearing 61y on shaft 61s between the main pulley 70 and the connecting driving and gearing system. One of these shafts is also provided with a further pulley 72 for a belt 73 which connects with a pulley 74 on the fly shaft 31 of the spreader device.

In operation, the pulley 70 is driven and therewith the two shafts 10s and 11s are rotated in opposite directions, with their adjacent sides moving downwardly. Cotton is permitted to enter the device from the hopper H, and the fly blades 34 effect a substantially uniform distribution of this cotton, delivering it in the directions of the arrows in Fig. 3 toward the spaces between the walls and screws. The screws operate to cause cotton which does not pass into the first extractor-feeder EF, to move along the intervening portion of the trough to the next extractor feeder EF. Cotton which is carried over the shafts 10s or 11s of the two screws during this feeding is carried along the ridge member 40 and moved back to the ascending or carrying side of the screw conveyer.

As the cotton arrives at the next extractor-feeder EF, this feeder becomes filled, and thus the conveyer-distributor operates for supplying all of the extractor-feeders from the single hopper H. At the openings into the individual extractor-feeders, the ridge member 40 extends across the opening and prevents an excessive delivery or excessive tightness of packing of the cotton into the corresponding extractor-feeder EF.

As shown in Figs. 1 and 3, the control gates for an individual feeder may be operated together by a handle 80 which is connected to a shaft 52, and operates through a crank arm 81 on this shaft 52 for moving a link 82 which is connected to a cross crank 83 supported by a pivot bearing structure 84 on the corresponding end wall 54. The cross crank 83 is connected by a link 85 to a rock arm 86 fastened to the other shaft 52.

It will be noted that in the illustrated form the axes of the two screw shafts 10s and 11s are located at the same level.

It is obvious that the invention is not limited to the form of construction shown, but that it may be modified in many ways within the scope of the appended claims.

I claim:

1. A conveyer-distributor comprising a trough having at least two discharge openings longitudinally spaced along its bottom, a pair of conveyer screws positioned and arranged with their axes substantially at the same level and extending along said trough and above the openings, means for rotating the screws so that their adjacent sides turn downwardly, and a ridge member in said trough extending upwardly between the screws and passing across at least one said opening to close a portion of the same beneath the space between the screws.

2. A conveyer-distributor comprising a trough having at least two discharge openings longitudinally spaced along its bottom, a pair of conveyer screws extending along said trough and above said openings, a deflector wall located above said screws and covering the space therebetween for preventing material which is being brought into the trough from passing into said space, a ridge member in said trough extending upwardly between the screws and passing across at least one said opening to close a portion of the same beneath the space between the screws, and means for rotating the screws so that their adjacent sides turn downwardly.

3. A conveyer-distributor comprising a trough having at least two discharge openings longitudinally spaced along its bottom, a pair of conveyer screws extending along the trough, means for rotating the screws so that their adjacent sides turn downwardly, said trough including ridge means extending upwardly between the screws and having its lower edges extending beneath the screws and across at least one discharge opening to prevent compression and packing of the conveyed material into the discharge opening, and deflector means located above the screws for preventing material which is being brought into the trough from passing into the space between the screws.

4. A conveyer-distributor comprising a trough having at least two discharge openings longitudinally spaced along its bottom, filling means for the trough located above one said opening, a pair of conveyer screws extending along the trough, means for rotating the screws so that their adjacent sides turn downwardly, a ridge member extending across said one opening and extending upward between the screws, and a deflector wall having downwardly inclined sides extending at least partly over each screw and located beneath the filling means for preventing material from passing directly into the space between said screws.

5. A conveyer-distributor comprising a trough having at least two discharge openings in its bottom, filling means for the trough, a pair of conveyer screws extending along the trough, a deflector wall including lateral mass deflecting side portions located beneath the filling means and covering the space between the screws for preventing material from passing directly into the said space, and a revolving spreading device located beneath the filling means for causing the material to be distributed to the opposite side portions of said deflector wall.

6. A conveyer-distributor comprising a trough having a bottom and side walls, the lower portions of the side walls being convergent and extending below the bottom from point to point for providing a plurality of discharge openings which are spaced longitudinally along the trough, a pair of conveyer screws positioned and arranged with their axes substantially at the same level and extending along said trough, and means for rotating the screws so that their adjacent sides turn downwardly, the bottom of said trough having a ridge extending upwardly between the screws, the ridge being continued substantially from end to end of the trough and across the discharge openings.

7. A conveyer-distributor comprising a trough having side walls and a bottom, pairs of discharge openings in said trough, said pairs of openings being longitudinally spaced along the trough, a pair of conveyer screws having their axes located substantially at the same level and extending along the trough, the side walls of the trough extending upwardly closely adjacent the outer sides of the screws, said trough also having a ridge extending upwardly between the screws passing longitudinally of the trough between the openings of each pair, each screw extending above one opening in each pair, means for rotating the screws so that their adjacent sides turn downwardly, and deflector means located above the screws for causing the introduced material to be divided and passed to the sides of the trough into the spaces at the sides between the corresponding screw and the adjacent side wall.

8. A conveyer-distributor comprising a trough, a pair of conveyer screws extending along the trough, a filling hopper above one end of the trough, said trough having pairs of laterally spaced discharge openings, said pairs of openings being longitudinally spaced along the trough, means for rotating the screws so that their adjacent sides turn downwardly, deflector means located beneath the hopper and above the screws for preventing material from passing directly to the sides and between the screws and operative for guiding the material from the hopper to the spaces between the screws and adjacent side walls of the trough, and a ridge extending substantially for the length of the trough and between the openings of each pair and extending upwardly between the screws and laterally beneath the screws for preventing the screws from causing a compression or packing of material into the discharge openings.

HUGH ROBERTS, Jr.